Aug. 10, 1926.
G. W. WATSON
1,595,532
MEASURING DEVICE FOR POWER TRANSMISSION
Filed Feb. 1, 1922 4 Sheets-Sheet 4
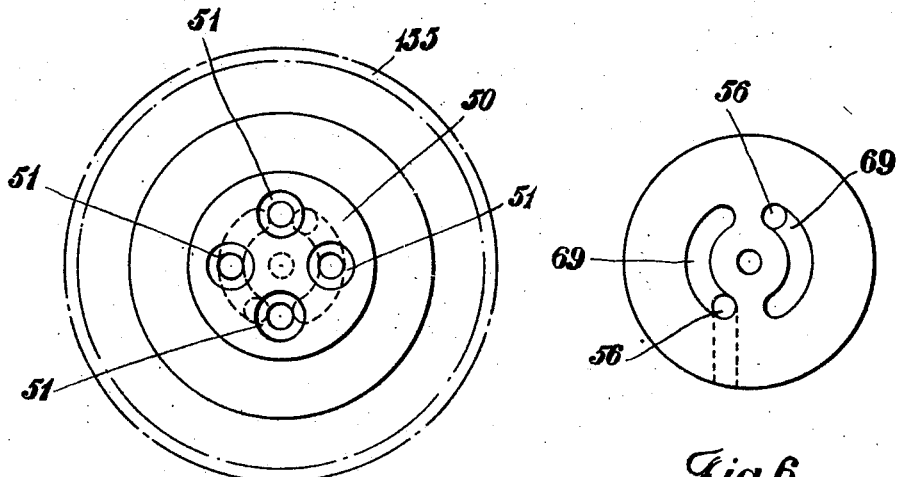
*Fig. 5.*   *Fig. 6.*
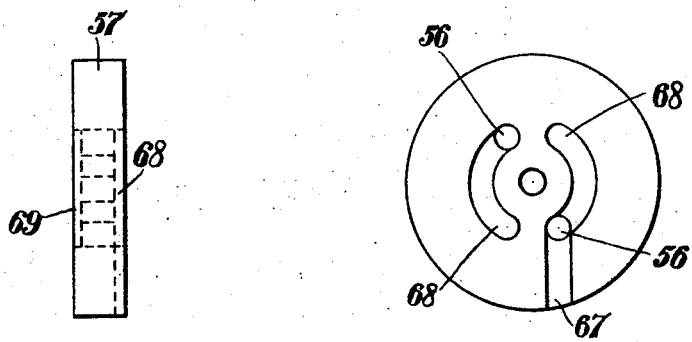
*Fig. 7.*   *Fig. 8.*

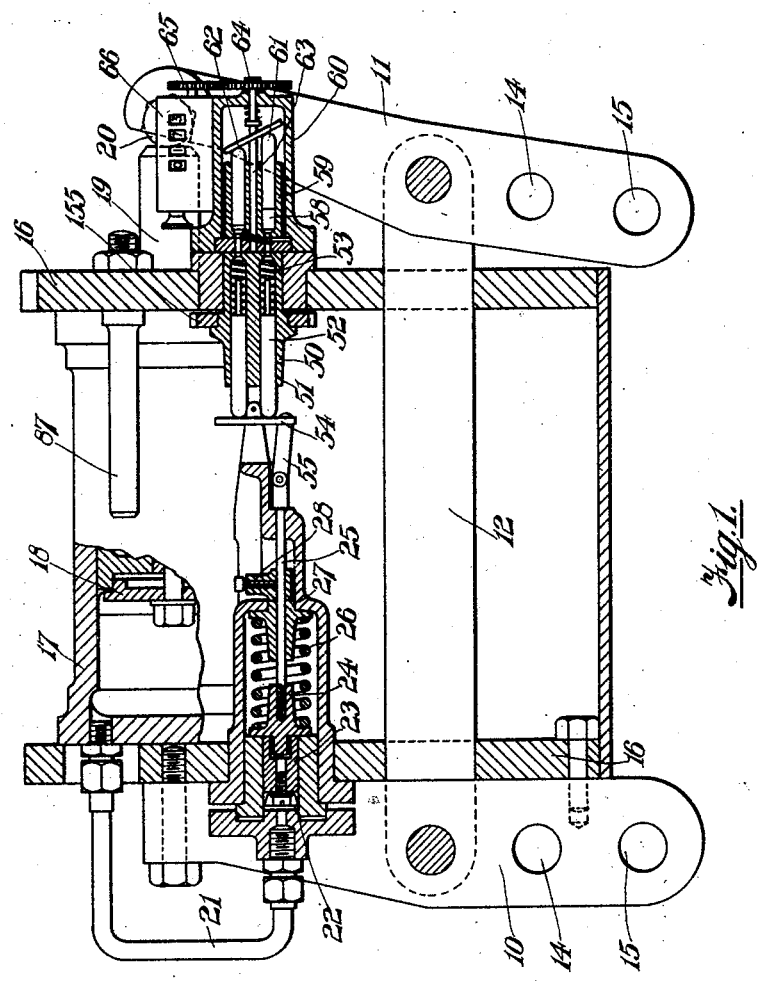

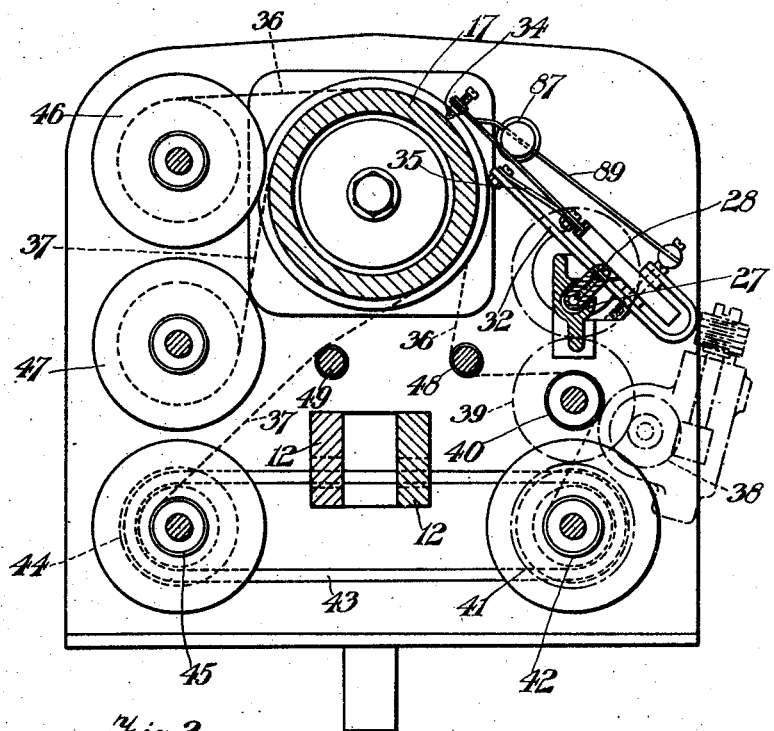

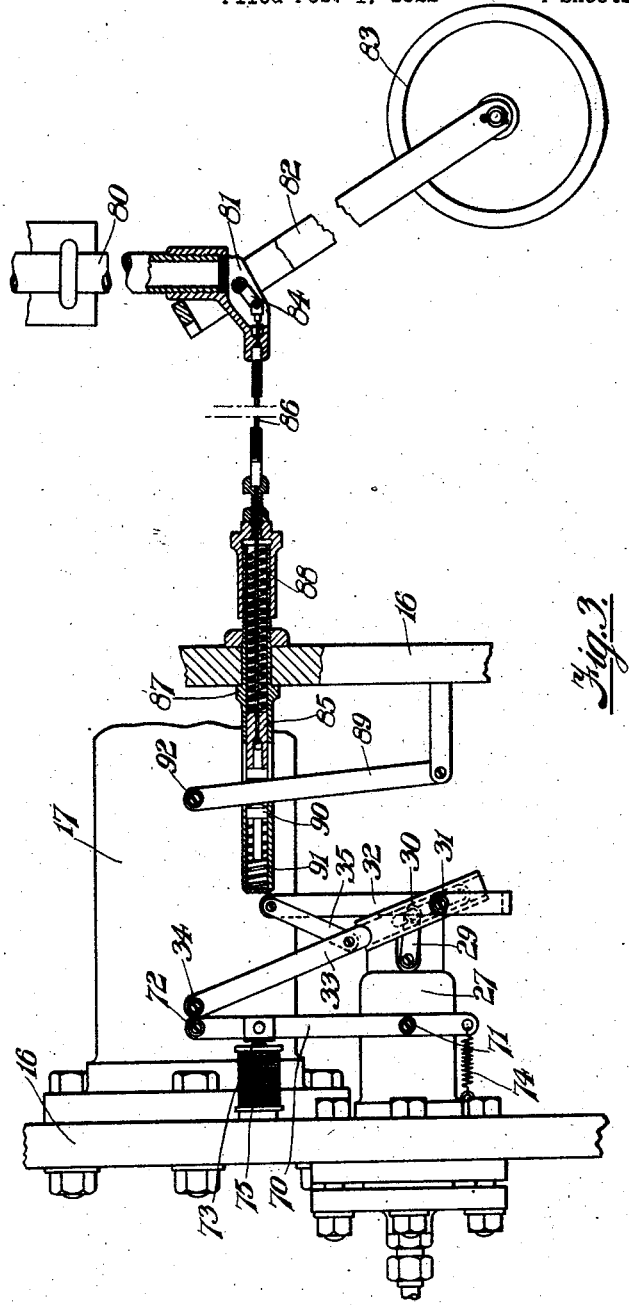

Patented Aug. 10, 1926.

1,595,532

UNITED STATES PATENT OFFICE.

GEORGE WILLIAM WATSON, OF LONDON, ENGLAND.

MEASURING DEVICE FOR POWER TRANSMISSION.

Application filed February 1, 1922, Serial No. 533,483, and in Great Britain February 3, 1921.

This invention consists in improvements in or relating to measuring devices for power-transmission and has, as one of its objects, to provide a device which will be particularly applicable for use in conjunction with mechanical tractors or pushers. In a particular application the measuring device is employed in conjunction with a mechanical tractor and plough or other hauled implements or vehicle for measuring conveniently the draw-bar pull and also the work performed.

Apparatus according to the present invention comprises in combination pressure-controlled means constructed to move proportionately with pressure derived from transmission of power, a pump or other "equivalent device" driven by means of an operative connection with a part (for example a track-wheel) which is moved proportionately with the distance through which the pressure operates, means for controlling the output of said pump or its "equivalent" operatively connected with and regulated by movement of the pressure-controlled means aforesaid, and a quantity-motor to measure the output of the pump or its "equivalent." In one form of the invention the means for varying the output of the pump operates to vary the stroke of the pump-plunger or plungers.

A feature of the invention comprises a particular form of pump for the said combination of parts, said pump comprising one or more plungers each fitting within a pump-barrel formed in or carried by a rotatable carrier with means to move each plunger in one direction against a cam-member which engages the end of the plunger and is so constructed that the operative pitch of the cam can be varied by means of an operative connection with the pressure-controlled means aforesaid whereby the pitch of the cam, and consequently the throw of the plunger, is varied in accordance with the pressure variations.

The cam-member may take the form of a plate against which the end of the plunger abuts, which is so mounted that it can be tilted to varying degrees of inclination to the axis of rotation aforesaid and is operatively connected with the pressure-controlled means whereby its inclination is varied in accordance with the pressure variations.

The invention also includes other features, for example, a hydraulic motor to be driven by the outflow from the said pump, and a meter operated by said motor; a chart for receiving impressions from a recording device either from the meter, or the pressure-controlled device or both of them, with or without means for producing also a time-record on the chart.

A further feature of the invention consists in introducing the pressure-controlled device in the draw-bar connection of a tractor (or pusher) and a vehicle moved thereby.

One preferred form of the invention will now be described in detail, by way of example, with reference to the accompanying drawings in which:—

Figure 1 is a sectional elevation showing the general-arrangement of the parts.

Figure 2 is a sectional elevation at right angles to Figure 1.

Figure 3 shows in detail the means employed for obtaining records on the chart.

Fig. 4 is a detailed section on an enlarged scale showing the means for recording the output of the pump.

Figure 5 is a detail elevation of the plug and associated parts.

Figure 6 is an elevation of one of the barrels showing the ports and the recesses therein.

Figure 7 is an edge elevation of the port plate.

Figure 8 is a view similar to Figure 6 showing the reverse side of the barrel.

Like reference numerals indicate like parts throughout the figures of the drawings.

As part of the draw-bar connection between a tractor and a plough or other implement to be drawn there are two parallel levers 10, 11 pivoted intermediate of their lengths to the opposite ends of a pair of rigid links 12 which separate them. Each of the levers 10, 11 is provided below its pivot centre with two holes 14, 15, one below the other, the tractor and the plough being connected respectively to levers 10, 11 by means of either the upper set of holes 14 or the lower set 15. The lever 10 is rigidly connected to a frame 16 (hereinafter referred to as the dynamometer frame), the point of connection of the upper end of this lever to the frame being coincident with the axis of a cylinder 17, which is rigidly secured by bolts between the two end plates of the frame. Sliding within the cylinder 17 is a piston 18 provided with a piston-rod 19 which projects outwardly into contact with the upper end of the lever 11. Engagement between these two parts is made by means of a hardened steel ball 20, which, when a pull is applied at the lower end of the lever 11, presses on to the free end of the piston-rod. The space within the cylinder 17 on the opposite side of the piston-rod is filled with fluid and this space communicates by means of a conduit 21 with a smaller cylinder 22. The conduit 21 and cylinder 22 are also filled with fluid. When pressure is applied to the fluid in the cylinder 17 this is transmitted to the cylinder 22 and in consequence a piston 23 working within this cylinder is moved outwardly. Outward movement of this piston is transmitted to a flanged member 24 carrying a spindle 25 and this outward movement is resisted by means of a spring 26 located within a casing 27 carried rigidly on the frame 16. Secured to the spindle 25 is a cross-head 28, and it will be seen that when a pull is exerted between the tractor and the plough this cross-head will move through a distance proportional to the pull exerted. In testing a plough of light resistance connection would be made from the tractor and the plough to the lower holes 15 in the levers 10, 11 respectively, and in the case of a plough which may be expected to offer the maximum resistance within the capacity of the testing instrument the connection between the tractor and plough would be made by way of the upper set of holes 14. Outward movement of the cross-head 28 is transmitted to a recording stylus for the purpose of obtaining a record upon a paper chart of the draw-bar pull. The operation of this part of the mechanism will be more fully described hereinafter.

Mounted for rotation within a bushing carried by an end plate of the frame 16 is a cylindrical plug 50 within which four cylindrical cavities 51 are bored, the axis of each of which is parallel with the axis of the plug 50 but is spaced apart therefrom. The four cavities are uniformly disposed around the plug and within each of them fits a pump-plunger 52, the cavities constituting pump-barrels. The inner end of each plunger is engaged by one end of a coiled spring 53 the opposite end of which bears against the inner end of the corresponding barrel whereby the plungers are normally pressed outwardly by the springs. The outer ends of the plungers, which are rounded for antifriction purposes, are pressed outwardly by the springs 53 into contact with a cam-plate 54 which is pivotally mounted on an extension of the casing 27 in order to swing about an axis which is at right angles to and intersects the axis of the plug 50. The lower end of the cam-plate is connected by means of a link 55 to the outer or free end of the spindle 25. The plug 50 is rotated by means of a gear wheel 155 which is in turn driven from a spur-wheel 39 included in suitable gearing from one of the wheels of the vehicle or from part of the transmission from the engine to the driving wheels and therefore rotates at a speed directly proportionate to the speed of travel of the vehicle. When the fluid in the cylinder 17 is under no pressure the face of the cam-plate 54 is perpendicular to the axis of rotation of the plug 50, but it will be seen that when pressure is applied to the fluid by means of a pull between the tractor and the plough, the cam-plate will be tilted to an angle proportionate to the pressure exerted on the fluid. Thus movement of the spindle 25 will vary the degree of tilting of the plate and it will be obvious that if the cylindrical plug be rotated the plungers carried thereby will be constantly oscillated in their barrels. As the plug is rotated each plunger will travel over the surface of the plate from a position at which the plate is nearer the plug to a position at which it is further away therefrom, and back again, the springs forcing the plungers outwardly and the inward movement being brought about by the pressure of the inclined plate against the outer end of the plungers as the latter are rotated.

Each of the barrels 51 communicates at its inner end by way of ports 56 in a fixed port-plate 57 such as shown and described in Letters Patent of the United States No. 1,459,644 granted to me June 19, 1923, to four corresponding barrels 58 formed in a second plug 59 mounted so as to be capable of rotating within a casing 60 about an axis coincident with that of the plug 50. Within the barrels in the second plug is a corresponding number of pistons 61 the outer ends of which bear against a second cam-plate 62 fixed within the casing 60. The second cam-plate 62 is so mounted within the casing that its inclination to the axis of rotation of the plug may be adjusted to any desired degree and then fixed. To the plug 59 is centrally secured a spindle 63 journalled at one end in the port-plate and at the other in the casing 60, through which it passes. To the outer end of this spindle is attached a gear-wheel 64, which transmits motion to a second gear-wheel 65 mounted on the driving spindle of a standard form of revolution counter 66. The inner ends of both sets of barrels and the passages in the port-plate communicating therebetween are filled with fluid. The interior of the casing 60 is also filled with fluid and communicates with the ports in the port-plate by means of a duct 67 which in turn is in open communication with the lower of two crescent-shaped recesses 68 formed in the face of the port-plate 57. The two recesses 68 are arranged concentrically on the port-plate, one occupying the upper portion of the plate and the other the lower portion. The recesses are separated one from the other by narrow strip metal which is flush with the face of the port-plate. The opposite face of the port-plate is similarly formed with two crescent-shaped recesses 69, and the two sets of recesses communicate with each other by means of through-way ports 56 referred to above. There are two of these through-way ports, one connecting the upper pair of recesses on opposite sides of the port-plate and the other communicating between the lower pair of recesses. The through-way between the lower recess 68, the lower port 56, and the lower recess 69 constitute a suction connection for the variable throw-pump 50, while the upper set of passages constitute the delivery-conduit for said pump. It will be seen, therefore, that as fluid is pumped by each of the plungers 52 in turn the plungers 61 will be forced outwards against the cam-plate 62, and thereby rotary motion will be transmitted to the plug 59, and by means of the spindle 63 to the revolution-counter 66. A spring 170 is provided in order to maintain the face of the plug 59 in close contact with the corresponding face of the port-plate 57.

It will be appreciated that as the plug 50 rotates at a speed directly proportional to the speed of travel of the tractor and as the cam-plate 54 assumes an inclination proportional to the draw-bar pull (i. e. the resistance of the plough) the output of the pump unit constituted by the plungers 52 and corresponding barrels will thus be directly proportional to the amount of work done. Moreover the speed of rotation of the spindle 63 is proportional to the output of the aforesaid pump-unit and therefore constitutes a measure of work performed. The revolution-counter may be calibrated to give a direct reading of the units of work performed at the draw-bar connection. The plug 59 and plungers 61 constitute a hydraulic motor driven by the alternate pressure and suction strokes of the pump 50, that is to say a motor energized by the power output of the pump, the motor casing 60, the barrels 51 and 58 and the passages communicating therebetween constituting a closed fluid circuit.

Rotary motion of the motor is caused by the action of fluid forced into the barrels 58: the plungers 61 are forced outwardly in order, and the reaction of the canted plate 62 produces rotary motion of the plungers and the plug 59.

The means for obtaining records on a paper chart will now be described.

Outward movement of the cross-head 28 is transmitted through a link 29 (Figure 3) to a stylus-lever-carrier 30 which in turn is pivotally mounted at 31 on a plate 32 rigid with the frame. Slidably mounted within the carrier 30 is a stylus-lever 33 which carries at its outer end an adjustable stylus-point, 34. The stylus-lever itself is operatively connected to the plate 32 by means of a link 35 pivotally connecting these two members. By these connections movement of the cross-head 28 is proportionately increased at the stylus 34 to which an approximately straight-line motion is also transmitted. The stylus-point bears upon the upper surface of a roll of paper 36 which passes over and partly encircles the outer surface of the cylinder 17. Beneath this roll of paper is a second roll of paper 37, the upper surface of which is treated with carbon compound and when therefore pressure is applied to the upper roll an impression is made on the under surface of this roll due to the pressure applied on the carbon treated surface of the lower roll. Both rolls of paper are caused to travel at a speed directly proportional to the speed at which the tractor is being driven. The means employed for transmitting motion to the rolls comprise a flexible shaft (not shown) driven from one of the tractor wheels or from a trailing castor-wheel of known circumferential dimensions. The flexible shaft drives by means of worm and worm-wheel gearing 38 a spur-wheel 39 connected to a feed-roll 40 over which travels the upper plain roll of paper, the feed-roll being provided with a number of spiked projections which positively engage the edges of the paper. The gear-wheel 39 drives a similar wheel with which is integral a chain sprocket 41, by frictional contact with the end face of this sprocket a flanged reel 42 is driven. On to this flanged reel is wound up the paper on which an impression has been made. Driven by means of a chain 43 from the sprocket 41 is a second sprocket 44 by a frictional contact with an end face of which a second flanged reel 45 is rotated. On to the reel 45 is wound the used carbon-treated paper. As the reels 42 and 45 are frictionally-driven it will be seen that as the diameter of each roll increases due to the winding on of the paper slip may take place between the end face of the reels and the corresponding face of the chain sprockets. The upper plain paper is supplied to the recording cylinder from a reel 46 while the carbon paper is supplied by a reel 47, guide rollers 48 and 49 being provided in order to guide the used plain paper and used carbon paper respectively as they leave the cylinder.

In order also to provide on the paper roll a record of the time occupied during any particular test the following mechanism is provided:—

A second stylus-lever 70 is pivotally mounted at 71 on the outside of the casing 27. One end of this lever carries a stylus point 72 which bears upon the paper roll aforesaid at a point in line with the stylus 34 which records the draw-bar pull. Intermediate the stylus-point and pivot centre of the lever 70 the latter carries a soft-iron pole-piece 73 while the end of the lever remote from the stylus-point is linked by means of a tension spring 74 to the main frame of the dynamometer. This spring tends normally to keep the pole-piece out of contact with an electro-magnet 75 secured to the frame. The electro-magnet is energized by a battery circuit the current in which is interrupted by a clock-work mechanism. The electric-circuit is normally open but by means of the clockwork mechanism is momentarily closed at equal intervals of time. When the circuit is closed the pole-piece is attracted by the magnet, and the stylus-point, which normally inscribes a straight line on the paper roll, makes a sideways diversion or kink from this line. As the paper is being moved at a speed proportionate to the speed of the travel of the tractor, it is therefore possible to calculate from the distance between the kinks on the time line, the speed of travel at any desired point on the record made on the paper.

In order to make the record on the paper chart as complete as possible means are also provided to record the depth at which the plough is working. These means take the form of a vertical spindle 80 clamped in any convenient position on the plough frame, the lower end of this spindle being formed with a bracket 81 to which is pivotally connected a hanging stirrup 82 which carries at its lower end a castor-wheel 83. Projecting from the pin on which the stirrup is pivotally mounted is a short lever 84 which in conjunction with the stirrup forms a bell-crank-lever. The position in which this apparatus is clamped to the plough frame is such that the lower edge of the castor-wheel is at the same level as the bottom of the plough shares when the latter are raised from the ground. It follows, therefore, that as the plough shares sink into the ground the vertical spindle 80 will sink with them but the castor-wheel will be arrested by contact with the surface of the un-ploughed ground. Consequently there will be relative movement between the bell-crank-lever and the vertical spindle 80 about the point of pivoting of the stirrup. This movement is transmitted to a piston 85 by means of a tension-wire 86. This piston is mounted within a sleeve 87 secured to one of the end plates of the dynamometer frame. As the plough sinks into the ground the piston 85 will be pulled against the action of a spring 88 through a distance proportionate to the depth of ploughing and conversely as the plough rises from the ground the spring 88 will automatically force the piston back again in the reverse direction. The piston 85 abuts one edge of a stylus lever 89 which passes through a slot in the sleeve 87, the opposite edge of the lever being engaged by a plunger 90 maintained in contact with the lever by means of a light spring 91. The spring 91 and the plunger 90 cause the stylus-lever to follow the various movements of the piston 85. The stylus-lever is pivotally mounted at one end to a part rigid with the frame and at the other end carries a stylus-point 92 which bears on the roll of paper 36 at a point in line with the two stylus-points 34 and 72 aforesaid. In this way records of depth and any variations in the depth of ploughing are recorded on the paper chart. It will be seen that with the appartus hereinbefore described a chart will be obtained bearing three records, one of time, another of pressure at the draw-bar connection and another representing the depth of ploughing and the variations in the depth. From this chart and from the indications of the revolution-counter the useful work in ploughing may be quickly ascertained and the non-useful work on the headlands can also be determined with comparative accuracy.

It will be realized that any device the output of which can be varied proportionately to the product of the pressure and the distance travelled may be employed in place of the pump unit herein described in detail, and such device is to be understood to be the "equivalent" referred to at the commencement of this specification and in the claims.

It is obvious that the paper chart may be caused to pass over any desired surface, not necessarily that of the cylinder 17 as has been described in the foregoing example.

I claim:—

1. A measuring apparatus for power transmission, comprising pressure controlled means constructed to move proportionately to the driving effort, a pump capable of having its output varied, a member to drive said pump constructed to move proportionately to the distance through which the point of application of the driving effort is moved, means responsive to movements of said first mentioned means for varying the output of said pump, and means for measuring the output of said pump.

2. Apparatus according to claim 1 wherein the means for varying the output of the pump includes a movable element and means to vary the extent of movement of said element.

3. A measuring apparatus for power transmission comprising a frame, a cylinder mounted in said frame, a piston in said cylinder, a lever pivoted on said frame and having two ends, a connection between said piston and one end of said lever, a draft connection on the other end of said lever, a second draft connection on said frame, a reciprocating pump having a variable throw mounted in said frame, a member to drive said pump constructed to move proportionately to the distance through which the point of application of the driving effort is moved, pressure controlled means connected to said cylinder, means responsive to said pressure control means for varying the throw of said pump, a fluid motor having an intake connected to the outlet opening of said pump, a meter driven by said fluid motor, a movable chart mounted in said frame, means for moving said chart at a speed directly proportional to the speed at which said pump is driven, a stylus lever co-operating with said chart, a link connecting said stylus lever to said means for varying the throw of said pump, a second stylus lever co-operating with said chart, means for moving said second stylus lever for recording the depth of ploughing on said chart, a third stylus lever mounted on said frame, and means for moving said third stylus lever at regular time intervals.

4. A measuring apparatus for power transmission comprising pressure controlled means constructed to move proportionately to the driving effort, a hydraulic device for converting mechanical movement into a flow of fluid, a hydraulic device connected to said first mentioned hydraulic device for converting said flow of fluid into mechanical movement, each of said hydraulic devices being of a reciprocating type and one of said hydraulic devices having a variable throw, means responsive to the movements of said first mentioned means for varying said throw, and means for measuring mechanical movement of said second mentioned hydraulic device.

In witness whereof I affix my signature.

GEORGE WILLIAM WATSON.